Patented June 24, 1941

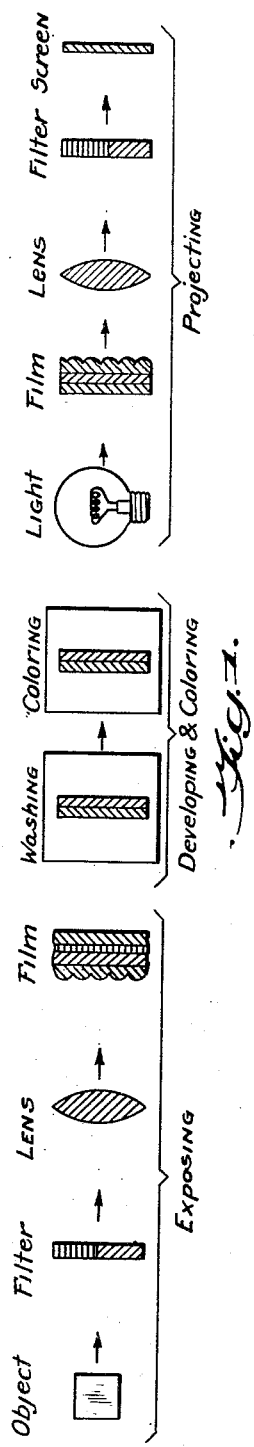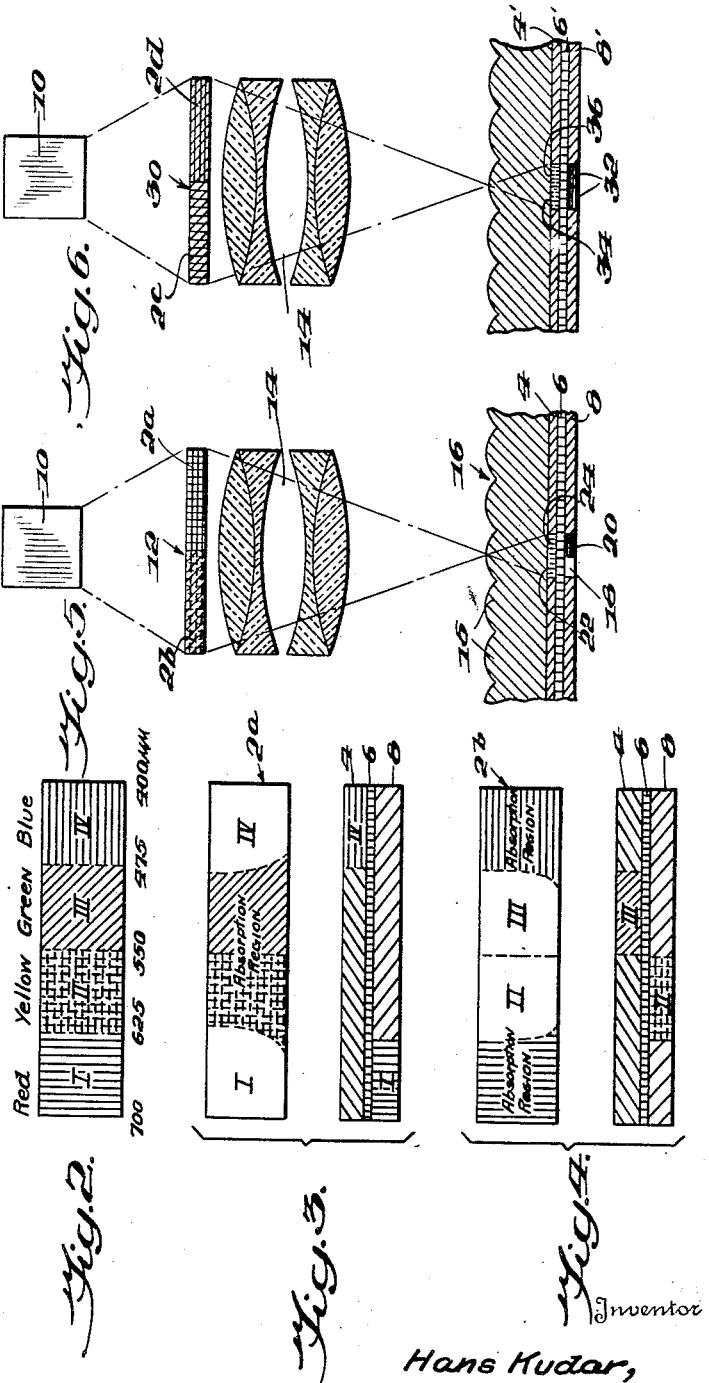

2,246,997

UNITED STATES PATENT OFFICE 2,246,997

COLOR PHOTOGRAPHY

Hans Kudar, Berlin-Schoneberg, Germany

Application October 27, 1939, Serial No. 301,661
In Germany July 18, 1935

7 Claims. (Cl. 95—2)

This invention relates to a method of color photography, more particularly color cinematography, and to a plate or film for carrying out said method.

Lenticular films are used for pictures in natural colors in such manner that by means of each embossed lens, the images of three filter stripes are projected upon the light sensitive emulsion. However, there are difficulties in printing such images which are partly caused by the incompleteness of the image of a picture element of the first film on an embossed lens of the second film. Another difficulty lies in that films with an embossed lens formation require a particularly strong light source when projected. Because of these difficulties in printing, and large absorption of light by the color filters, attempts have been made to produce subtractive color printings from pictures made on films with an embossed lens formation. To this end, it has been proposed to make the three-color picture by using a film having an embossed lens formation, only for two colors, for example, blue and green, and to use a second separate film for the third color, this second film touching the first film with its emulsion side, and the two films together permitting the production of subtractive three-color prints. However, subtractive three-color pictures can hardly reach the quality of the additive reproduction of colors, since the absorption spectra of the subsequent three-color layers merge into one another, distortions of color being caused thereby.

An object of this invention is to produce a method of color photography which combines the advantages of high projection efficiency obtained by subtractive color reproduction, with the advantage of true color projection obtained by the additive mixing of the colors.

Another object of the invention is to employ a lenticular film for the reproduction of at least three colors.

Another object of the invention is to produce a method of color photography in which at least four colors are subtractively recorded upon a film, and are additively projected from said film.

Another object of the invention is to produce in color photography a more accurate reproduction of natural colors by increasing the spectral range of a photographic film.

According to the invention the production upon a film of component images in four colors, which permits a simple projection from the film of the composite image in its natural colors, is obtained by using in combination with a two-color filter, a lenticular film having two light-sensitive layers lying behind one another, and which are sensitized for complementary colors, and a filter layer between them which is transparent only for the colors for which the light-sensitive layer lying behind it is sensitive.

This invention enables the life-like reproduction of colors beyond the limits of efficiency of the known three-color photography. The inadequacy of the known color reproduction by component images in three colors is particularly noticed with whitish colors, and with colors of complicated spectral structure. The well known cause for this difficulty lies in the impossibility of reproducing photographically the monochromatic colors of the spectrum unless a great number of color components be used. The color reproduction is much more perfect if not three, but four color components are used. However, the additive projection of four colors which would involve complicated technical provisions is avoided by the method of this invention.

This application is a continuation-in-part of co-pending application Serial No. 91,401, filed July 18, 1936. The present application gives a more detailed description of color examples than was disclosed in the prior application.

The invention is more fully described with reference to the accompanying drawing, in which:

Fig. 1 is a flow diagram illustrating the various steps in exposing, developing, and projecting the film.

Fig. 2 is a diagram illustrating the range of the visible spectrum for which various portions of the film are sensitized.

Fig. 3 is a diagram illustrating the application of light in the spectrum ranges I and IV of Fig. 2 applied to the film.

Fig. 4 is a view similar to Fig. 3, but illustrating light from ranges II and III applied to the film.

Fig. 5 is a diagrammatic view illustrating the production of four-color photographs; and Fig. 6 is a view similar to Fig. 5, but relating to the production of three-color photographs.

In Fig. 1 the general process is illustrated diagrammatically. The light rays from the object to be photographed are passed through a filter and a lens, and impinge upon a lenticular film, within which the colors are separated according to a predetermined plan. The film is then developed, which includes the washing of the negative and the coloring of the exposed portions thereon with colors complementary to those which caused such developed portions. When the thus prepared film is projected, light emitted from the light source passes first through the colored film, then through a filter similar to that used when the film was exposed, and impinges upon a screen to reproduce the object in colors.

The lenticular film used in the method of this invention carries on its smooth side a light-sensitive emulsion, the light sensitiveness of which is limited, for instance, to the short-wave part of the visible spectrum. On this emulsion there is a thin filter layer which includes a dye adapted to be washed out, for absorbing short-wave rays, and this layer carries another light-sensitive emulsion sensitized, for instance, for the long-wave part of the visible spectrum. The three layers are inseparable from one another. For making the picture a two-colored filter is necessary, each half of which covers one-half of the picture field of the embossed lenses.

Fig. 2 shows the four spectrum ranges into which the spectrum from red to violet is subdivided in order to obtain the colors for which the film is sensitized. Range I includes the wave lengths from 625 to 700$\mu\mu$, range II the wave lengths from 550 to 625$\mu\mu$, range III the wave lengths from 475 to 550$\mu\mu$, and range IV the wave lengths from 400 to 475$\mu\mu$. One-half of the filter is transparent for the colors I and IV, for example, red and blue, and is made, for instance, of gelatine dyed with rhodamine, and the other half of the filter is transparent for II and III yellow and green, but absorbent for I and IV, and is made, for instance, of gelatine dyed with naphthol-green.

The relationship between the two-part filter and the film is more clearly shown in Figs. 3 and 4. It is asumed that the rays from white light containing all colors are being passed through a filter upon a film. In Fig. 3, filter 2a represents the filtering action of one-half of the two-colored filter referred to above, and is absorptive for the colors in ranges II and III, but passes the colors of ranges I and IV. The film is composed of sensitized layers 4 and 8 separated by a yellow filter layer 6, which is absorptive of blue. Emulsion layer 4 is sensitized only for the wave lengths of green and blue in ranges III and IV, and as only the blue and red rays can pass filter 2a, the layer 4 reacts only to the blue light. At the same time, filter 2a absorbs the yellow light of range III and passes only the red light through to layer 8, which is sensitized for the yellow and red wave lengths of ranges I and II. Filter layer 6 absorbs the light from range IV so that layer 8 is exposed to the red light only.

Fig. 4 shows the function of the other part of the two-part filter. This half of filter 2b is absorptive for the colors red and blue in ranges I and IV, respectively, and passes colors yellow and green in ranges II and III. The film is the same as in Fig. 3, but in this case, layer 4 is exposed only to the green light of range III, while the layer 4 is exposed to the yellow light of range II.

The combined action of these two filter halves upon the exposing of the lenticular film of this invention, is illustrated in Figs. 5 and 6.

In Fig. 5 the light rays coming from the object 10 pass through the two-color filter 12 having a portion transparent for red-blue corresponding to filter 2a, Fig. 3, and a yellow-green portion corresponding to filter 2b, Fig. 4, and are projected through lens 14 onto the lens elements 15 of lenticular film 16.

This film is similar to that shown in Figs. 3 and 4 and has two light-sensitive layers 4 and 8 lying behind one another, and a filter layer 6 arranged between them. The layer 4, lying next to the lenticular surface, is sensitized for blue and green, while the layer 8 is sensitized for red and yellow. Filter lays 6 is transparent only for red and yellow, so that it prevents the layer 8 from being exposed to blue rays.

Through the lens elements 15 of the lenticular surface, both halves of filter 12 are recorded at each picture spot side by side. Light coming from a red spot upon object 10 passes to the left half 18 of the corresponding spot in the layer 8, while the right half 20 of this spot, as well as both halves 22 and 24 of the corresponding spot in the first layer 4, remain unexposed.

After the film has been developed and the negative component images have been converted into colored positives, the colors of which are complementary to those which caused the negative images, the exposed half spot 18 will appear colorless, while the other half 20 of the same spot will turn out blue-green, and the entire corresponding spot in the layer 4 will appear a yellowish-red.

After the dyestuff has been washed out of the filter layer 6, the film is projected by means of a white light in a projector provided with a filter similar to the filter 12. The light ray passing through the half spots 20 and 24 lying behind one another and colored blue-green and yellow-red, respectively, is entirely absorbed, while the light ray passing through the half spots 18 and 22 (the half spot 18 being colorless and the half spot 22 being yellow red) is colored yellowish-red and is turned into pure red by being passed through the part 2a of filter 12, which absorbs the yellow component.

Blue, green, or yellow spots of the object are recorded and reproduced in the same way subtractively, while spots of mixed color expose the corresponding spots in both light-sensitive layers. After developing such a photographic picture, first the negative silver picture consisting of four component pictures is obtained, and behind each embossed lens there are, in pairs side by side and behind one another, the blackenings corresponding to the four different spectrum ranges. The further treatment of the picture consists in converting the inseparable picture layers into positive colored pictures, the layer recording the blue and green rays being turned into a positive picture in red-yellow, and the layer recording red and yellow rays being turned into a positive picture in blue-green, and in washing out the dyestuff from the filter layer so as to make it transparent for all colors. The same mixed color will be reproduced additively.

In Fig. 6 a three-color system is shown. The filter 30 has a red-blue zone 2c and a red-green zone 2d. The light-sensitive layer 4' of the film is sentitized for blue and green, the layer 8' is sensitized for red, while the filter layer 6' is absorbent for blue and green.

Light from a red spot of the object exposes the whole corresponding spot 32 in the layer 8', while both halves 34 and 36 of the corresponding spot in the layer 4' remain unimpressed. In the positive, therefore, the half spots 34 and 36 will be colored red, while the spot 32 will be colorless. In projecting, light rays penetrating these spots will be colored yellow but it will pass through both halves of the filter 30 only red, as both halves of the filter are transparent for red, absorbing the yellow component.

Light from a blue spot of the object exposes the left half 34 of the corresponding spot in the layer 4', while the right half 36 of this spot, as well as the whole corresponding spot 32 in the layer 8' will remain unexposed. In the positive, therefore, the left half 34 of the spot in the layer 4' will appear colorless, while the right half 36 of this spot will be colored yellow-red, and the whole spot 32 in the layer 8' will be colored blue-green. In projecting, the light rays falling upon the right half of spot 32 and the half spot 36 lying in front of it will therefore be wholly absorbed, while the light ray penetrating through the left half of spot 32 and the half spot 34 will be colored blue-green, and as the right half of the filler 30 is absorbent for green, a pure blue light will be emitted therefrom.

A green spot upon the object will be recorded and reproduced in the same way subtractively, while yellow spots or spots of mixed color will expose the corresponding spots in both light-sensitive layers to a certain extent, and consequently the same yellow or mixed color will be reproduced additively.

The conversion of the silver negatives into colored positives in all forms of the invention can be made according to any known method. For instance, both light-sensitive emulsions may contain leuco compounds. In this case the two-colored positive pictures are produced at the originally unexposed spots by known methods. It is also possible to produce stained color pictures; for this purpose it is advantageous to use a fine grained silver halogen emulsion for the filter layer, which has little light sensitiveness and causes very little light diffraction, in order to effect chromium tanning of the filter layer containing silver, in a suitable phase of the operation to obtain a water-tight seal between the two picture layers, whereupon the production of the blue-green positive picture can be accomplished without disturbing the previously made and now water-tightly enclosed red-yellow positive picture. In general, every method which can be used with inseparable picture layers is suitable for producing subtractive two-color pictures, the basic colors of which consist of the complementary parts of the visible spectrum.

The described method has the following advantages as compared to other methods:

a. More perfect color reproduction because of the use of at least four spectrum ranges;

b. The complementary absorption spectra of the two subtractive layers do not interfere practically with one another, in contradistinction to the absorptions with three subtractive layers;

c. A fine structure of the picture as compared to the known three-color additive method as here each embossed lens has to produce the images of only two filter portions instead of three, and therefore the space occupied by a picture element is correspondingly smaller;

d. Less light losses than with the known three-color additive method as here the projection filter weakens the light only by 50%, while the light losses caused by three-color filters are considerably higher;

e. The diameter of the embossed lenses upon the lenticular film may be smaller than with the three-color method, since the picture element consists of only two components, consequently such a film can be made with a finer grid, and the optical printing is made easier.

Having now described a method by which the objects of this invention may be obtained, what I claim is:

1. The method of color photography which consists in exposing through a two-color filter, a lenticular film having two light-sensitive layers lying behind one another and which are sensitized for substantially complementary colors, and a filter layer between them which is transparent only for the colors for which the light-sensitive layer lying behind it is sensitized; developing the negative component images in said light-sensitive layers, and washing out the filter layer between them; and converting each of the two negative component images thus produced into a positive colored in the colors for which the light-sensitive layer containing the other negative component image was sensitized.

2. The method of color photography which consists in exposing through a two-color filter, a lenticular film having two light-sensitive layers lying behind one another and which are sensitized for substantially complementary colors, and a filter layer between them which is transparent only for the colors for which the light-sensitive layer lying behind it is sensitized; developing the negative component images in said light-sensitive layers, and washing out the filter layer between them; converting each of the two negative component images thus produced into a positive colored in the colors for which the light-sensitive layer containing the other negative component image was sensitized; and projecting the positive component images in their given relative position in the film through a filter similar to that used in taking the pictures.

3. The method of color photography which consists in exposing through a two-color filter, a lenticular film having two light-sensitive layers lying behind one another, one of said layers being sensitized for colors lying within the short-wave part of the visible spectrum, the other layer being sensitized for colors lying within the long-wave part thereof, and a filter layer between said light-sensitive layers which is transparent only for the colors for which the light-sensitive layer lying behind it is sensitized; developing the negative component images in said light-sensitive layers, and washing out the filter layer between them; and converting each of the two negative component images thus produced into a positive colored in the colors for which the other light-sensitive layer was sensitized.

4. The method of color photography which consists in exposing through a filter comprising a red-blue zone and a yellow-green zone, a lenticular film having two light-sensitive layers lying behind one another, one of which is sensitized for blue and green, the other layer being sensitized for red and yellow, and a filter layer between said light-sensitive layers which is transparent only for the colors for which the light-sensitive layer lying behind it is sensitized; developing the negative component images in said light-sensitive layers, and washing out the filter layer between them; and converting each of the two negative component images thus produced into a positive colored in the colors for which the other light-sensitive layer was sensitized.

5. The method of color photography which consists in exposing through a filter comprising a red-blue zone and a yellow-green zone, a lenticular film having two light-sensitive layers lying behind one another, the layer lying next to the lenticular surface being sensitized for blue and green, and the other layer being sensitized for red and yellow, and a filter layer between said light-sensitive layers which is transparent only for red and yellow; developing the negative component images in said light-sensitive layers, and washing out the filter layer between them; and converting the negative component image in the light-sensitive layer arranged next to the lenticular surface into a positive colored in red-yellow, and the negative component image in the other light-sensitive layer into a positive colored in blue-green.

6. The method of color photography which consists in exposing through a filter comprising a red-blue zone and a red-green zone, a lenticular film having two light-sensitive layers lying behind one another, one of which is sensitized for blue and green, and the other layer being sensitized for red, and a filter layer between said light-sensitive layers which is transparent only for the colors for which the light-sensitive layer lying behind it is sensitized; developing the negative component images in said light-sensitive layers, and washing out the filter layer between them; and converting each of the two negative component images then produced into a positive colored in the colors for which the other light-sensitive layer was sensitized.

7. The method of color photography which consists in exposing through a filter comprising a red-blue zone and a red-green zone, a lenticular film having two light-sensitive layers lying behind one another, the layer lying next to the lenticular surface being sensitized for blue and green, and the other layer being sensitized for red, and a filter layer between said light-sensitive layers which is transparent only for red; developing the negative component images in said light-sensitive layers, and washing out the filter layer between them; and converting the negative component image in the light sensitive layer arranged next to the lenticular surface into a positive colored in red, and the negative component image in the other light-sensitive layer into a positive colored in blue-green.

HANS KUDAR.